United States Patent
Lee (10) Patent No.: US 7,821,528 B2
(45) Date of Patent: Oct. 26, 2010

(54) APPARATUS AND METHOD FOR VIDEO SEARCHING IN A MOBILE COMMUNICATIONS TERMINAL

(75) Inventor: Eun-Sang Lee, Gyeonggi-Do (KR)

(73) Assignee: LG Electronics Inc., Seoul (KR)

( * ) Notice: Subject to any disclaimer, the term of this patent is extended or adjusted under 35 U.S.C. 154(b) by 1356 days.

(21) Appl. No.: 11/298,179

(22) Filed: Dec. 8, 2005

(65) Prior Publication Data
US 2006/0120670 A1  Jun. 8, 2006

(30) Foreign Application Priority Data
Dec. 8, 2004 (KR) .................. 10-2004-0103140

(51) Int. Cl.
*H04N 7/14* (2006.01)
(52) U.S. Cl. ............... 348/14.15; 348/14.01; 348/14.02
(58) Field of Classification Search ... 348/14.01–14.16; 386/46–70; 360/72.1–72.3; 725/9, 21, 46, 725/58, 48, 53
See application file for complete search history.

(56) References Cited

U.S. PATENT DOCUMENTS 6,334,022 B1 * 12/2001 Ohba et al. .................. 386/46
7,394,480 B2 * 7/2008 Song ....................... 348/14.02
2003/0110515 A1 * 6/2003 Satoda ....................... 725/135
2004/0175058 A1   9/2004 Jojic et al.

FOREIGN PATENT DOCUMENTS

| JP | 08-292965 | 11/1996 |
| JP | 2000-209531 | 7/2000 |
| JP | 2003-274361 | 9/2003 |
| JP | 2004-254065 | 9/2004 |
| JP | 2004-320646 | 11/2004 |
| KR | 10-2006-0030270 | 4/2004 |

* cited by examiner

*Primary Examiner*—Melur Ramakrishnaiah
(74) *Attorney, Agent, or Firm*—Lee, Hong, Degerman, Kang & Waimey (57) ABSTRACT

An apparatus and method for detecting video in a mobile communications terminal, wherein the apparatus for detecting the video of the mobile communications terminal comprises a scene change frame detector to detect a preset number of scene change frames based on input streaming video data and output the detected scene change frames, and a display unit to display the outputted scene change frames according to a user's request for video searching.

39 Claims, 11 Drawing Sheets

APPARATUS AND METHOD FOR VIDEO SEARCHING IN A MOBILE COMMUNICATIONS TERMINAL

CROSS-REFERENCE TO RELATED APPLICATIONS

Pursuant to 35 U.S.C. §119(a), this application claims the benefit of earlier filing date and right of priority to Korean Application No. 103140/2004, filed on Dec. 8, 2004, the contents of which is hereby incorporated by reference herein in its entirety

BACKGROUND OF THE INVENTION

1. Field of the Invention

The present invention relates to a mobile communications terminal, and specifically, to an apparatus and method for efficient video image searching of videos in a mobile communications terminal.

2. Description of the Related Art

A mobile communications terminal is a communications device allowing a user to place wireless calls to another party and providing a wireless connection anytime and anywhere through a switching control of a MSC (Mobile Switching Center) while moving in a service region managed by a BS (Base Station). The mobile communications terminal enables data communications using symbols, numbers, characters, or the like, and multimedia communications including images and videos, as well as voice communications to be performed.

The mobile communications terminal is provided with various additional services that are commonly used in everyday life in addition to typical communication functions in order to provide the user with additional convenience and communications applications. Among the additional services, a camera function for capturing videos (moving pictures) and images is often provided. A conventional method for searching through video recordings, clips or images (hereafter referred to as "video search") in a mobile communications terminal supporting a camera function will be explained with reference to FIG. 1.

Figure 1:
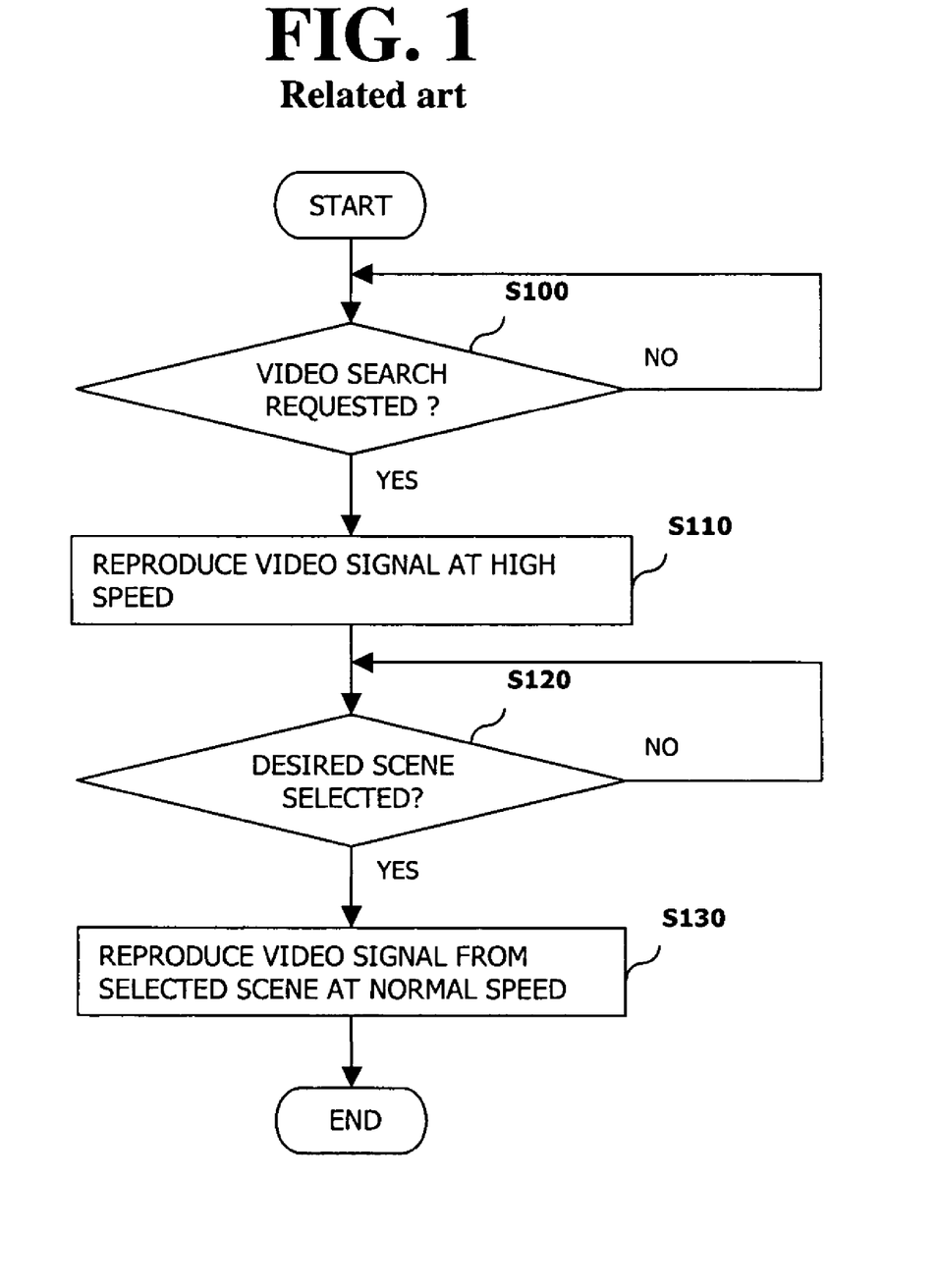
FIG. 1 is a flowchart illustrating a conventional method for video image searching in a mobile communications terminal.

FIG. 1 is a flowchart illustrating a conventional method for video search in a mobile communications terminal. As illustrated in FIG. 1, a conventional method for video search in a mobile communications terminal includes: confirming whether a search for a stored video signal is requested (S100); when the search for the stored video signal is requested, reproducing the searching-requested video signal at high speed (S110); searching a desired scene from the video signal reproduced at the high speed (S120); and reproducing the video signal from the searched scene at a normal speed (S130).

The mobile communications terminal confirms whether the user has requested a search for a stored video signal (S100). When the video search is requested, the mobile communications terminal sequentially reproduces the video signal on its display device (screen) at high speed from the beginning or starting point of the video recording (S110).

The mobile communications terminal can reproduce (play back) the stored video signal at a pre-set speed that is greater than a normal reproducing speed to allow the user to quickly view its contents. Specifically, a function similar to the "fast forward" or "preview" function in typical video play back devices is performed.

Thereafter, the user searches for and selects his desired scene from the video signal being reproduced (S120), and the mobile communications terminal can reproduce the video signal beginning from the searched scene (S130) at a normal reproducing speed. The selection of a desired scene may involve the user's manipulation of various control functions, such as by keys or buttons, to stop the high speed play back after the user recognizes a start point of a scene he wishes to view, rewind the video to a position prior to the start point of the desired scene and resume normal play back at that point to allow reproduction of the desired scene.

However, in the conventional method for video search in a mobile communications terminal, the video signal must be sequentially reproduced at high speed from the video recording beginning, or starting point, in order to perform the video search. Accordingly, it may take a long time for the user to search through the video in order to locate a desired scene. Increased battery consumption of the mobile communications terminal and an inefficient video searching procedure results.

Therefore, there is a need for an apparatus and method that facilitates an efficient and convenient video search of a video signal. The present invention addresses these and other needs.

SUMMARY OF THE INVENTION

Features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

The invention is directed to provide an apparatus and method for efficient video image searching of videos in a mobile communications terminal. Scene change frames are detected and inserted into a video signal and the pre-set scene change frames are utilized when searching the stored video in order to facilitate efficient video image searching.

In one aspect of the present invention, an apparatus for video image searching in a mobile communications terminal is provided. The apparatus includes a scene change frame detector adapted to detect a preset number of scene change frames in streaming video data in response to a user request for video searching and to output the detected scene change frames and a display unit adapted to display the detected scene change frames.

It is contemplated that the apparatus further includes a video decoder adapted to decode an input video signal and to output the decoded video signal as streaming video data. Preferably, the scene change frame detector further includes a candidate motion frame detector adapted to detect candidate motion frames in the streaming video data, a scene change preliminary candidate frame detector adapted to detect a scene change preliminary candidate frame based on the detected candidate motion frames, a scene change timer adapted to determine a generation time of the detected scene change preliminary candidate frame, a scene change candidate frame detector adapted to detect a scene change candidate frame based on the determined generation time and a scene change frame determiner adapted to determine a scene change frame based on a number of detected scene change candidate frames.

Preferably, the scene change frame determiner is adapted to determine the scene change frame based a number of detected scene change candidate frames that is equal to a preset reference value. Preferably, the candidate motion frame detector is further adapted to detect a current frame as the candidate motion frame when a difference between a motion value of pixels in the current frame and a motion value of pixels in a reference frame is greater than a preset reference value.

It is contemplated that the candidate motion frame detector is further adapted to select the reference frame according to a preset frame unit. Preferably, the candidate motion frame detector is further adapted to determine the motion value of the pixels in the reference frame by adding the motion values of selected pixels according to a preset pixel unit.

It is contemplated that the scene change preliminary candidate frame detector is adapted to detect a current candidate motion frame as the scene change preliminary candidate frame when a difference between a brightness value of pixels in the current candidate motion frame and a brightness value of pixels in a reference frame is greater than a preset reference value. Preferably, the scene change timer is further adapted to add a time flag field to the detected scene change preliminary candidate frame, the time flag field comprising the generation time of the detected scene change preliminary candidate frame.

It is contemplated that the scene change candidate frame detector is adapted to detect a current scene change preliminary candidate frame as the scene change candidate frame when a difference between a generation time of the current scene change preliminary candidate frame and generation time of a previous scene change candidate frame is greater than a preset reference value. Preferably, the scene change frame determiner is further adapted to adjust the number of detected scene change candidate frames such that the number of detected scene change candidate frames is equal to the preset reference value.

It is contemplated that the scene change frame determiner is further adapted to add at least one scene change candidate frame when it is determine that the number of detected scene change candidate frames is smaller than the preset reference value, the at least one added scene change candidate frame between scene change candidate frames having the greatest difference in generation times. Preferably, the scene change frame determiner is further adapted to determine the at least one added scene change candidate frame as a frame in the middle of the scene change candidate frames having the greatest difference in generation times.

It is contemplated that the scene change frame determiner is further adapted to remove at least one scene change candidate frame when it is determined that the number of detected scene change candidate frames is greater than the preset reference value, the at least one removed scene change candidate frame having the smallest difference in generation times from an adjacent scene change candidate frame.

In another aspect of the present invention, a method for video image searching in a mobile communications terminal is provided. The method includes detecting a preset number of scene change frames in streaming video data in response to a user request for video searching, outputting the detected scene change frames and displaying the detected scene change frames.

It is contemplated that the method further includes decoding an input video signal and outputting the decoded video signal as streaming video data. Preferably, the method further includes detecting candidate motion frames in the streaming video data, detecting a scene change preliminary candidate frame based on the detected candidate motion frames, determining a generation time of the detected scene change preliminary candidate frame, detecting a scene change candidate frame based on the determined generation time, determining whether the scene change candidate frame is completely detected and determining a scene change frame based on a number of detected scene change candidate frames when the scene change candidate frame is completely detected. It is further contemplated that the method further includes determining the scene change frame based a number of detected scene change candidate frames that is identical to a preset reference value.

It is contemplated that detecting candidate motion frames includes calculating a difference between motion values of pixels in a current frame and motion values of pixels in a reference frame, comparing the calculated difference with a preset reference value and detecting the current frame as the candidate motion frame when the calculated difference is greater than the preset reference value. Preferably, the method further includes selecting the reference frame according to a preset frame unit.

It is contemplated that the method further includes determining the motion value of the pixels in the reference frame by adding motion values of selected pixels according to a preset pixel unit. Preferably, detecting the scene change preliminary candidate frame includes calculating a difference between brightness values of pixels in the current candidate motion frame and brightness values of pixels in a reference frame, comparing the calculated difference with a preset reference value and detecting the current candidate motion frame as the scene change preliminary candidate when the calculated difference is greater than the preset reference value.

It is contemplated that the method further includes adding a time flag field to the detected scene change preliminary candidate frame, the time flag field comprising the generation time of the detected scene change preliminary candidate frame. Preferably, detecting the scene change candidate frame includes calculating a difference between the generation time of a current scene change preliminary candidate frame and a generation time of a previous scene change candidate frame, comparing the calculated difference to a preset reference value, detecting the current scene change preliminary candidate frame as the scene change candidate frame when the calculated difference is greater than the preset reference value and counting the number of the detected scene change candidate frames.

Preferably, determining the scene change frame includes determining the number of detected scene change candidate frames, comparing the detected number of the scene change candidate frames to a preset reference value and determining the detected scene change candidate frames as a scene change frame when the number of detected scene change candidate frames is equal to the preset reference value.

It is contemplated that the method further includes adjusting the number of detected scene change candidate frames such that the number of detected scene change candidate frames is equal to the preset reference value, the adjustment based on a difference between the detected number of the scene change candidate frames and the preset reference value. Preferably, adjusting the number of detected scene change candidate frames includes adding at least one scene change candidate frame when the number of detected scene change candidate frames is smaller than the preset reference value, the at least one added scene change candidate frame between scene change candidate frames having the greatest difference in generation times. It is further contemplated that the method further includes determining the at least one added scene change candidate frame as a frame in the middle of the scene change candidate frames having the greatest difference in generation times.

It is contemplated that adjusting the number of detected scene change candidate frames includes removing at least one scene change candidate frame when the number of detected scene change candidate frames is greater than the preset reference value, the at least one removed scene change candidate frame having the smallest difference in generation times from an adjacent scene change candidate frame In another aspect of the present invention, a mobile communication terminal is provided. The mobile terminal includes a video recorder adapted to capture video recordings, a memory adapted to store the video recordings, a display device adapted to display the stored video recordings and a processor adapted to process a stored video recording according to frames by comparing a number of pixels of a current frame with a number of pixels of a reference frame to determine whether the current frame should be used as a scene change frame that can be viewed by a user when searching for a desired scene, generate and insert scene change frame information corresponding to at least one scene change frame into portions of the stored video recording and display the scene change frames upon a user request to search scenes in the stored video recording.

It is contemplated that the processor is further adapted to compare the pixels of the current frame with the pixels of every nth frame of the stored video recording. Preferably, the processor is further adapted to compare the pixels of the current frame with the pixels of the reference frame by calculating differences between motion values of the pixels in the current frame and motion values of the pixels in the reference frame.

It is contemplated that the processor is further adapted to determine the current frame as a scene change frame if the current frame contains more changes in image motions than the reference frame. Preferably, the processor is further adapted to determine the changes in image motions by comparing brightness values of pixels in the current frame to brightness values of pixels in the reference frame.

It is contemplated that the processor is further adapted to generate the scene change frame information in a format that facilitates previewing by the user. Preferably, the processor is further adapted to include time data in the scene change frame information, the time data indicating a unique point in time of each scene change frame within a duration of the stored video recording.

In another aspect of the present invention, a mobile communication terminal is provided. The mobile terminal includes a transceiver adapted to receive signals including video recordings, a memory adapted to store the video recordings, a display device adapted to display the stored video recordings and a processor adapted to determine a number of scene change frames in a stored video recording based upon scene change frame information, the scene change frame information corresponding to at least one scene change frame inserted into the stored video recording, adjust the number of scene change frames such the number of scene change frames is equal to a reference value and display the scene change frames upon a user request to search scenes in the stored video recording.

It is contemplated that the processor is further adapted to adjust the number of scene change frames by one of adding scene change frames or removing scene change frames based upon a difference between the number of the scene change frames and the reference value. Preferably, the processor is further adapted to adjust the number of scene change frames based upon a time interval between adjacent scene change frames.

The foregoing and other objects, features, aspects and advantages of the present invention will become more apparent from the following detailed description of the present invention when taken in conjunction with the accompanying drawings. These and other embodiments will also become readily apparent to those skilled in the art from the following detailed description of the embodiments having reference to the attached figures, the invention not being limited to any particular embodiments disclosed.

Additional features and advantages of the invention will be set forth in the description which follows, and in part will be apparent from the description, or may be learned by practice of the invention. It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. Features, elements, and aspects of the invention that are referenced by the same numerals in different figures represent the same, equivalent, or similar features, elements, or aspects in accordance with one or more embodiments.

DETAILED DESCRIPTION OF THE PREFERRED EMBODIMENTS

The present invention relates to an apparatus and method for efficient video image searching of videos in a mobile communications terminal. Although the present invention is illustrated with respect to a mobile communication device, it is contemplated that the present invention may be utilized anytime it is desired to efficiently perform video image searching.

Reference will now be made in detail to some embodiments of the present invention, examples of which are illustrated in the accompanying drawings. Various components and procedures that would be known or understood to those skilled in the art will not be described in detail herein to prevent the features of the invention from being obscured.

Hereinafter, with reference to the accompanying drawings, an explanation will be made for an apparatus and method for video search in a mobile communications terminal according to the present invention, in which a pre-set number of scene change frames are detected with respect to a video signal and the detected scene change frames are added to a pre-set region of the video signal, thereby allowing efficient searching of scenes in the video recording. Hereafter, the phrase "video search" will refer to the operation that allows the user to look through portions of or the entirety of a video recording stored in a memory of the mobile communication terminal, similar to a so-called "fast-forward" function of a typical video recorder or video player.

Figure 2:
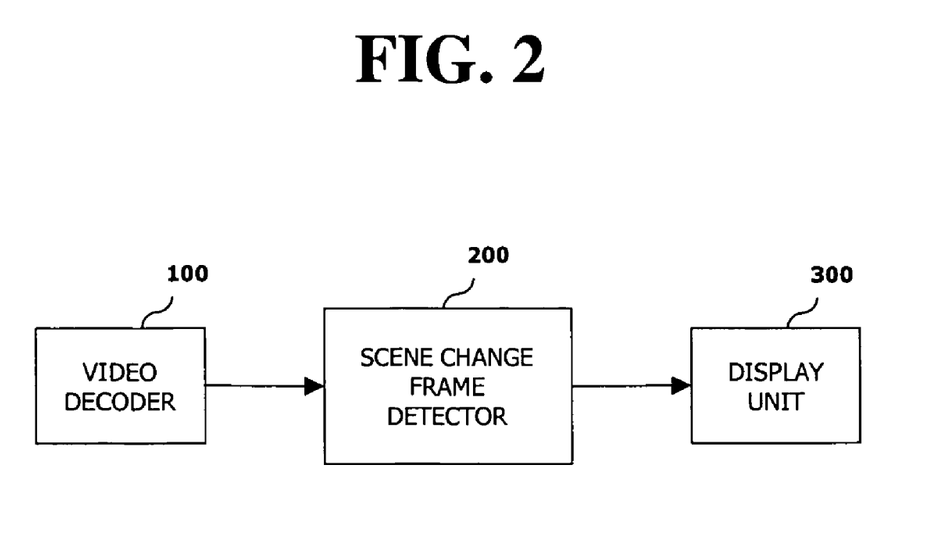
FIG. 2 is a block diagram illustrating an apparatus for video image searching in a mobile communications terminal according to one embodiment of the present invention.

FIG. 2 illustrates an apparatus for video search in a mobile communications terminal according to the present invention. As illustrated in FIG. 2, the apparatus includes: a video decoder 100 to decode an input video signal and output the decoded video signal as streaming video data; a scene change frame detector 200 to detect a scene change frame based on the streaming video data; and a display unit 300 to display the detected scene change frame in response to a user's request for video searching.

The apparatus detects a pre-set number of scene change frames of the input video signal by the scene change frame detector 200. A detailed construction the scene change frame detector 200 will be explained with reference to FIG. 3, which is a block diagram illustrating a detailed construction of a scene change frame detector of FIG. 2.

Figure 3:
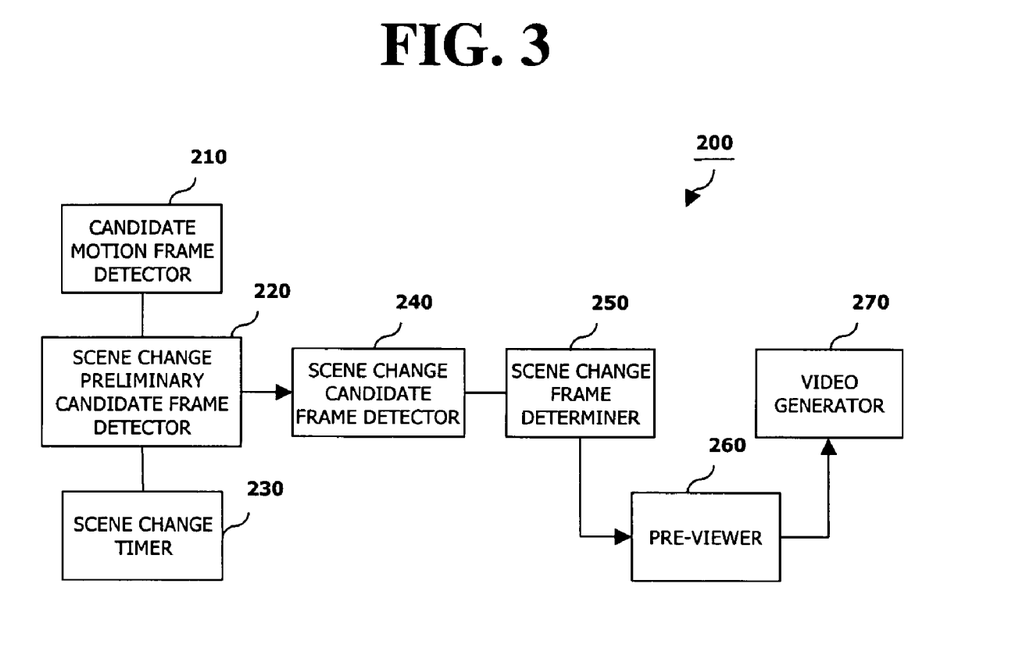
FIG. 3 is a block diagram illustrating a detailed construction of the scene change frame detector of FIG. 2.

As illustrated in FIG. 3, a scene change frame detector 200 according to the present invention may include: a candidate motion frame detector 210 to detect a candidate motion frame based on the input streaming video data; a scene change preliminary candidate frame detector 220 to detect a scene change preliminary candidate frame based on the detected candidate motion frame; a scene change timer 230 to determine and record a generation time of the scene change preliminary candidate frame in the detected scene change preliminary candidate frame; a scene change candidate frame detector 240 to detect scene change candidate frames based on the recorded generation time; a scene change frame determiner 250 to determine a scene change frame based on detected scene change candidate frames; a pre-viewer block 260 to convert the determined scene change frame into a format for a pre-viewing; and video generator 270 to add the converted scene change frame to a preset region of the input video signal.

Figure 4:
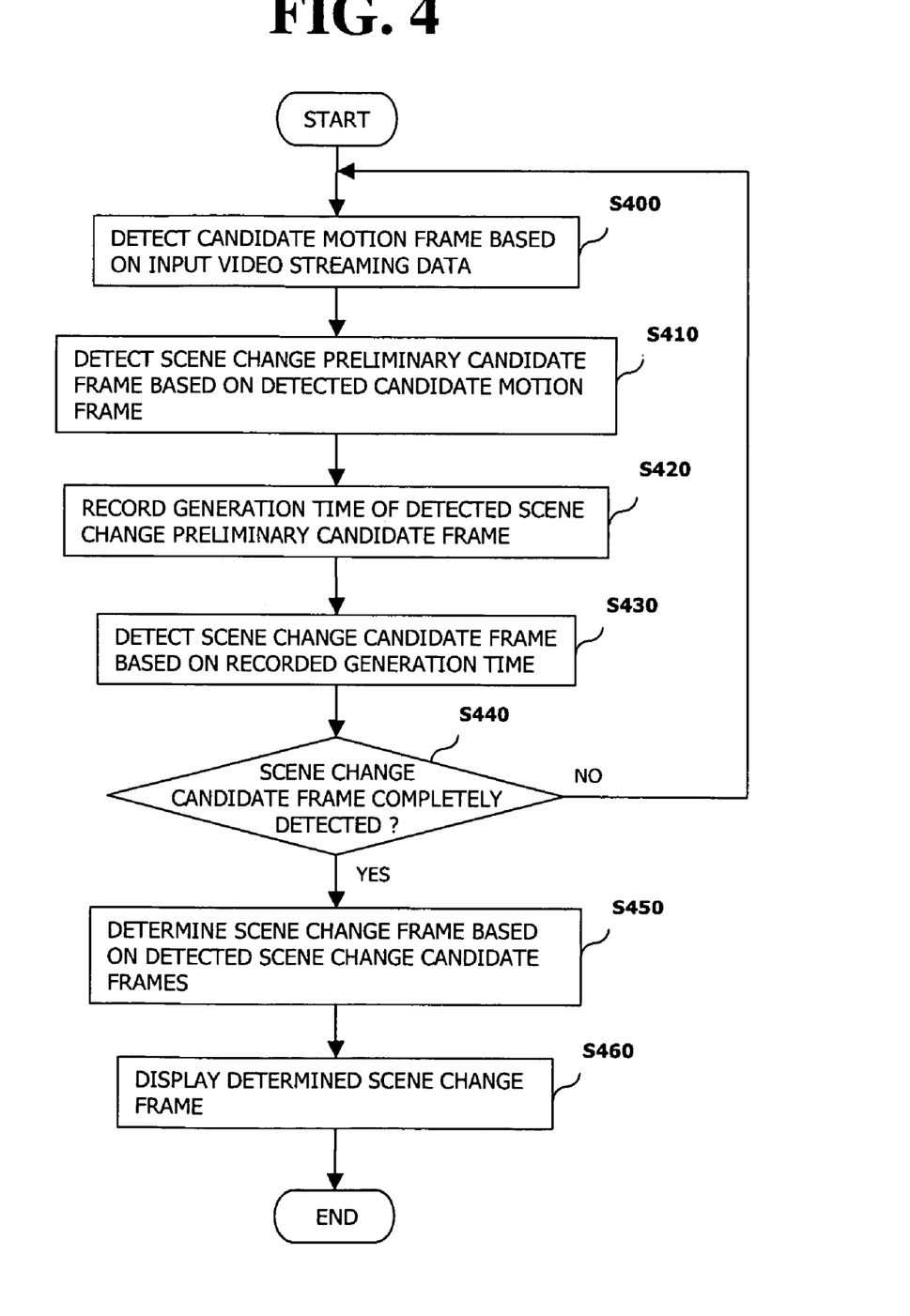
FIG. 4 is a flowchart illustrating a method for video image searching in a mobile communications terminal according to one embodiment of the present invention.

A method for video search in a mobile communications terminal using an apparatus for video search according to the present invention will be explained with reference to FIG. 4. FIG. 4 is a flowchart illustrating a method for video search in a mobile communications terminal according to the present invention.

As illustrated in FIG. 4, the method can include: detecting a candidate motion frame based on input streaming video data (S400); detecting a scene change preliminary candidate frame based on the detected candidate motion frame (S410); determining and recording a generation time of the scene change preliminary candidate frame in the detected scene change preliminary candidate frame (S420); detecting a scene change candidate frame based on the generation time (S430); determining whether a scene change candidate frame for the input streaming video data is successfully detected (S440); determining a scene change frame based on detected scene change candidate frames when the scene change candidate frames are completely detected (S450); and displaying the determined scene change frame in response to a user's request for video searching (S460).

The input streaming video data is processed according to each frame unit. The scene change frame detector 200 sets a frame selected according to a pre-set number of frames as a reference frame. For example, the pre-set number of frames can be set to 15 frames, but this number may be changed accordingly.

The candidate motion frame detector 210 detects a candidate motion frame based on the input streaming video data (S400). The method for detecting the candidate motion frame will be explained with reference to FIG. 5, which is a flowchart illustrating a detailed method for detecting a candidate motion frame.

Figure 5:
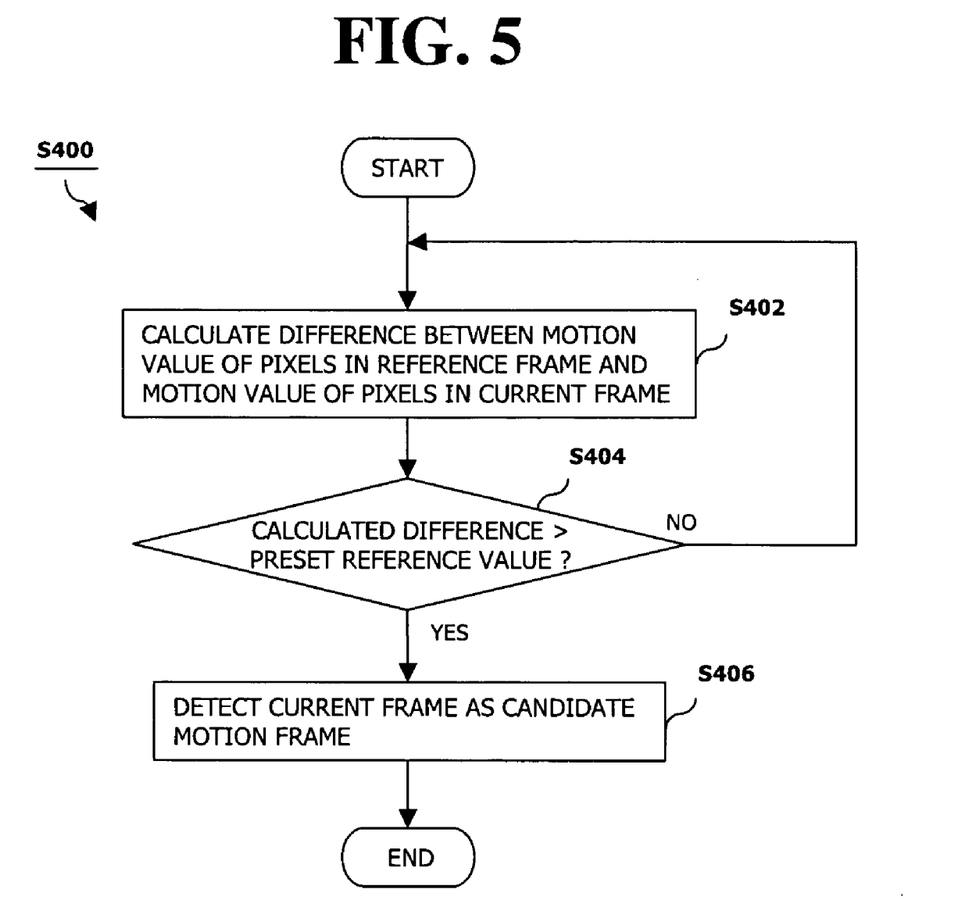
FIG. 5 is a flowchart illustrating a method for detecting a candidate motion frame according to one embodiment of the present invention.

As illustrated in FIG. 5, the method for detecting the candidate motion frame according to the present invention can include: calculating a difference between motion values of pixels in the reference frame and motion values of pixels in a current frame (S402); comparing the calculated difference with a preset reference value (S404); and when the calculated difference is greater than the pre-set reference value, detecting the current frame as the candidate motion frame (S406).

The candidate motion frame detector 210 compares the motion values of pixels in the reference frame and the motion values of pixels in the current frame in order to calculate a difference, represented by $V_{diff\_sum}$. Formula 1 can be used to obtain the difference between the pixels according to a pixel unit corresponding to a preset number of pixels, the preset number less than all the pixels (S402). The pre-set number of pixels, for example, may preferably be four pixels.

$$V_{diff\_sum} = \sum_{i=0, j=0}^{i+4, j+4} |V_{curr}(i, j) - V_{ref}(i, j)| \quad \text{(Formula 1)}$$

In Formula 1, $V_{curr}(i,j)$ denotes motion values of the (i,j)th pixels in the current frame and $V_{ref}(i,j)$ denotes motion values of the (i,j)th pixels in the reference frame.

The candidate motion frame detector 210 then compares the calculated difference with the preset reference value (S404). A difference value that is greater than the pre-set reference value indicates that the current frame contains more changes in image motions than the reference frame. Accordingly, the current frame is detected as a candidate motion frame (S406).

The scene change preliminary candidate frame detector 220 detects a scene change preliminary candidate frame based on the detected candidate motion frame (S410). The method for detecting the scene change preliminary candidate frame will be explained with reference to FIG. 6, which is a flowchart illustrating a detailed method for detecting a scene change preliminary candidate frame.

Figure 6:
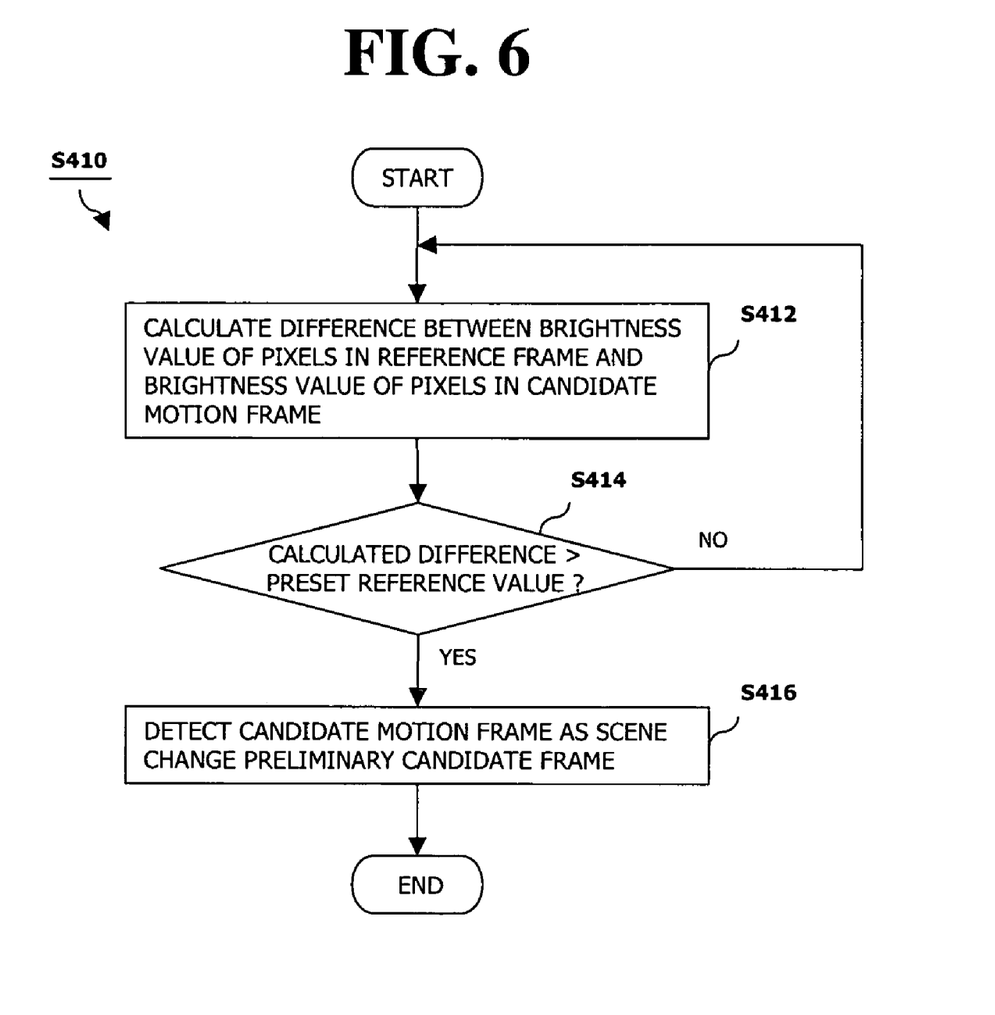
FIG. 6 is a flowchart illustrating a method for detecting a scene change preliminary candidate frame according to one embodiment of the present invention.

As illustrated in FIG. 6, the method for detecting the scene change preliminary candidate frame may include: calculating the difference between brightness values of pixels in the reference frame and brightness values of pixels in the detected candidate motion frame (S412); comparing each calculated difference with a preset reference value (S414); and when the calculated difference is greater than the preset reference value, detecting the candidate motion frame as the scene change preliminary candidate frame (S416).

The scene change preliminary candidate frame detector 220 compares the brightness value of the pixels in the detected candidate motion frame with compares the brightness value of the pixels in the reference frame and calculates the difference, represented by $B_{diff\_sum}$. Formula 2 can be used to obtain the difference between the pixels according to a unit corresponding to a pre-set number of pixels, the preset number less than all the pixels of the frame (S412).

$$B_{diff\_sum} = \frac{\sum_{i=0,j=0}^{i+4,j+4} V_{curr}(i,j)}{(h\_size * v\_size)/4} - \frac{\sum_{i=0,j=0}^{i+4,j+4} V_{ref}(i,j)}{(h\_size * v\_size)/4} \quad \text{(Formula 2)}$$

In formula 2, $V_{curr}(i,j)$ denotes motion values of the (i,j)th pixels in the current frame, $V_{ref}(i,j)$ denotes motion values of the (i,j)th pixels in the reference frame, h_size denotes the number of pixels in a horizontal direction of the current frame, and v_size denotes the number of pixels in a vertical direction of the current frame.

The scene change preliminary candidate frame detector 220 then compares the calculated difference with a pre-set reference value (S414). A difference that is greater than the pre-set reference value indicates that the current frame contains more changes in image motions than the reference frame. Accordingly, the scene change preliminary candidate frame detector 220 detects the candidate motion frame as a scene change preliminary candidate frame (S416).

The scene change timer 230 can add a time flag field to the detected scene change preliminary candidate frame. The scene change timer 230 determines and records a generation time of the scene change preliminary candidate frame in the added time flag field and outputs the scene change preliminary candidate frame containing the generation (S420).

The scene change candidate frame detector 240 detects a scene change candidate frame based on the detected scene change preliminary candidate frame (S430). The method for detecting the scene change candidate frame will be explained with reference to FIG. 7, which is a flowchart illustrating a detailed method for detecting a scene change candidate frame.

Figure 7:
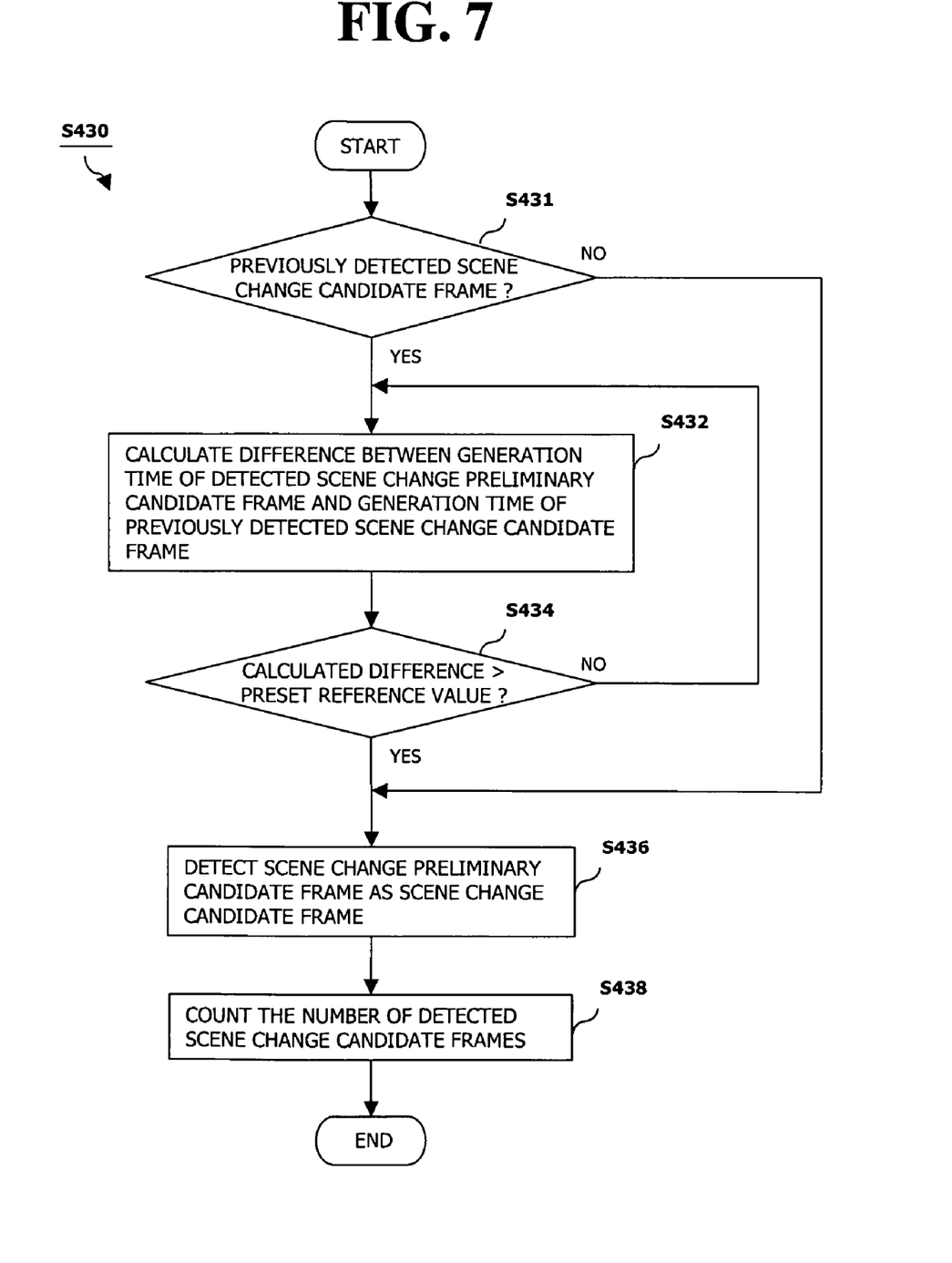
FIG. 7 is a flowchart illustrating a method for detecting a scene change candidate frame according to one embodiment of the present invention.

As illustrated in FIG. 7, the method for detecting the scene change candidate frame may include: calculating a difference between a generation time of the detected scene change preliminary candidate frame and a generation time of a previously-detected scene change candidate frame (S432); comparing the calculated difference to a pre-set reference value (S434); when the calculated difference value is greater than the pre-set reference value, detecting the scene change preliminary candidate frame as a scene change candidate frame (S436); and determining the number of detected scene change candidate frames (S438).

The scene change candidate frame detector 240 compares a generation time recorded in the scene change preliminary candidate frame to a generation time of a previously-detected scene change candidate frame in order calculate a difference (S432). However, when there is no previously detected scene change candidate frame, the scene change candidate frame detector 240 can detect the scene change preliminary candidate frame as a scene change candidate frame (S431).

If there is a previously detected scene change candidate frame, the scene change candidate frame detector 240 compares the calculated difference with a pre-set reference value (S434). The scene change candidate frame detector 240 detects the scene change preliminary candidate frame as the scene change candidate frame when the difference is greater than the pre-set reference value (S436).

The scene change candidate frame determiner 240 determines the number of detected scene change candidate frames (S438) and then confirms whether the scene change candidate frames for all the input streaming video date are completely detected (S440).

The scene change frame determiner 250 determines a scene change frame based on the detected scene change candidate frame when the scene change candidate frame is completely detected (S450). The method for determining the scene change frame will be explained with reference to FIG. 8, which a flowchart illustrating a detailed method for detecting a scene change frame.

Figure 8:
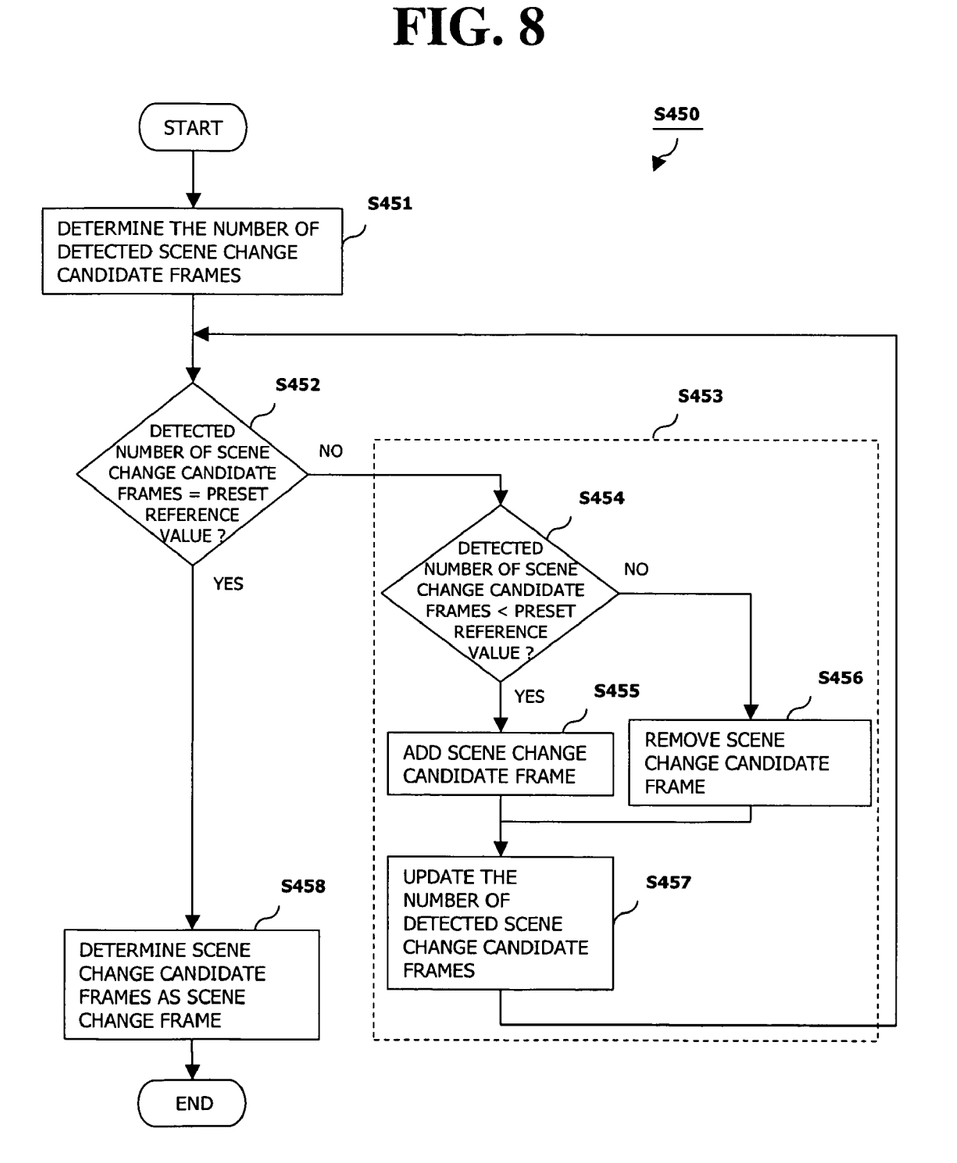
FIG. 8 is a flowchart illustrating a method for detecting a scene change frame according to one embodiment of the present invention.

As illustrated in FIG. 8, the method for detecting a scene change frame may include: determining the number of the detected scene change candidate frames (S451); comparing the number of the detected scene change candidate frames with a pre-set reference value (S452); and when the number of detected scene change candidate frames is equal to the pre-set reference value, determining the scene change candidate frames as a scene change frame (S458). When the number of detected scene change candidate frames is not equal to the pre-set reference value, the number of scene change candidate frames is adjusted according to the calculated difference value (S453).

The scene change frame determiner 250 determines the number of detected scene change candidate frames (S451) and compares the number of detected scene change candidate frames to a pre-set reference value (S452). The scene change frame determiner 250 determines the scene change candidate frame as the scene change frame and outputs the determined scene change frame when the number of detected scene change candidate frames is equal to the pre-set reference value. On the other hand, the scene change frame determiner 250 adjusts the number of scene change candidate frames if the number of detected scene change candidate frames is not equal to the preset reference value (S453).

The scene change frame determiner 250 determines whether or not the number of detected scene change candidate frames is smaller than the pre-set reference value (S454). When the number of detected scene change candidate frames is less than the pre-set reference value, the scene change frame determiner 240 adds an appropriate number of scene change candidate frames, such the number of scene change candidate frames equals the pre-set reference value (S455). When the number of detected scene change candidate frames is greater than the pre-set reference value, the scene change frame determiner 240 removes an appropriate number of scene change candidate frames such the number of scene change candidate frames equals the pre-set reference value (S456).

After adjusting the number of scene change candidate frames, the scene change frame determiner 250 updates the number of detected scene change candidate frames according to the number of added or removed scene change candidate frames (S457). The method for adding or removing the scene change candidate frame according to the present invention will be explained with reference to FIGS. 9A and 9B, which are views illustrating an operational principle for adjusting the number of scene change candidate frames according to the present invention.

Figure 9A:
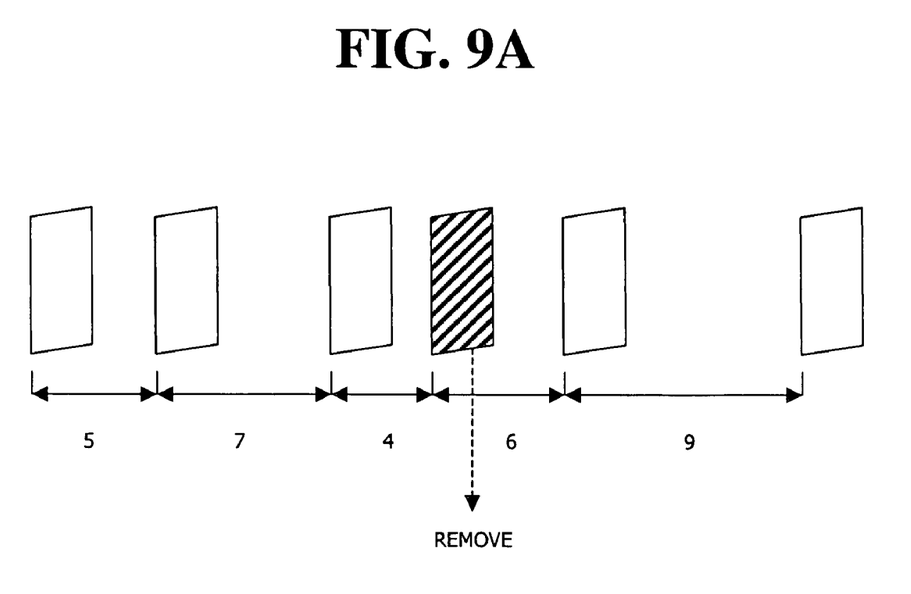
FIGS. 9A and 9B are views illustrating principles for adjusting the number of scene change candidate frames according to one embodiment of the present invention.

As illustrated in FIG. 9A, the scene change frame determiner 250 removes scene change candidate frames according to the calculated difference between the number of detected scene change candidate frames and the pre-set reference value when the number of detected scene change candidate frames is greater than the pre-set reference value. For example, the scene change frame determiner 250 calculates the difference between the generation times of the detected scene change candidate frames and compares the calculated differences in order to remove detected scene change candidate frames having the smallest difference in generation time from adjacent detected scene change candidate frames.

Figure 9B:
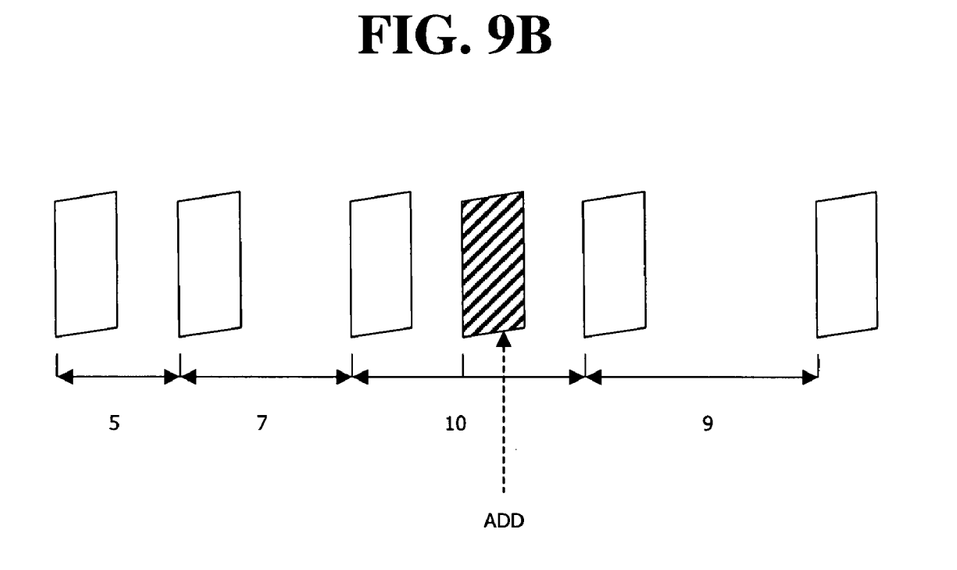

As illustrated in FIG. 9B, the scene change frame determiner 250 adds scene change candidate frames according to the calculated difference between the number of detected scene change candidate frames and the pre-set reference value when the number of detected scene change candidate frames is less than the pre-set reference value. For example, the scene change frame determiner 250 calculates the difference between the generation times of the detected scene change candidate frames and compares the calculated differences in order to add scene change candidate frames between detected scene change candidate frames having the greatest difference in generation times. Preferably, the added scene change candidate frames are positioned in the middle of the scene change candidate frames having the greatest difference in generation times.

The pre-viewer 260 converts the determined scene change frame into a format that facilitates pre-viewing on the display screen and outputs the converted scene change frame. The video generator 270 adds the converted scene change frame to a pre-set region of the input video signal. As a result, the mobile communications terminal can display the scene change frame on the display unit 300 in response to the user's request for the video searching (S460).

As described herein, in the apparatus and method for video searching in a the mobile communications terminal according to the present invention, a pre-set number of scene change frames with respect to the video signal are detected and the detected scene change frames are added to the pre-set region of the video signal in order to facilitate efficient video searching.

Figure 10:
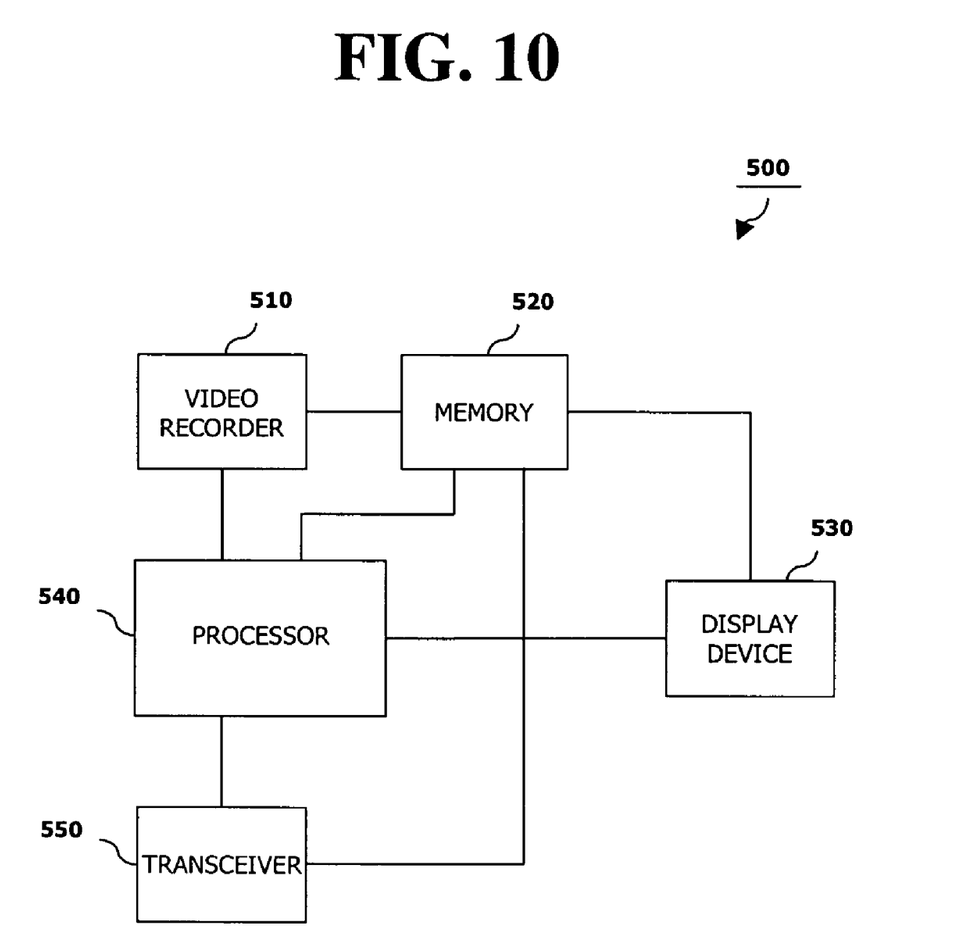
FIG. 10 is a block diagram of a mobile communications terminal according to one embodiment of the present invention.

FIG. 10 illustrates a mobile communication terminal 500 according to one embodiment of the present invention. The mobile terminal includes: a video recorder 510 adapted to capture video recordings; a memory 520 adapted to store the video recordings; a display device 530 adapted to display the video recordings stored in the memory; and a processor 540 adapted to cooperate with the video recorder, the memory, and the display device to perform the method for video searching according to the present invention by processing the stored video recordings according to their frames by comparing a number of pixels of a current frame with a number of pixels of a reference frame to determine whether the current frame should be used as a scene change frame that can be viewed by a user when searching for a desired scene, generating and inserting scene change frame information related to one or more scene change frames into portions of the stored video recording, and displaying the scene change frames upon a user request to search scenes in the stored video recording.

The reference frame can be every nth frame of the video recording. Comparing a number of pixels of a current frame with a number of pixels of a reference frame can be performed by calculating differences between motion values of pixels in the current frame and motion values of pixels in the reference frame.

The current frame can be a scene change frame if the current frame contains more changes in image motions than the reference frame. The changes in image motions can be determined by comparing brightness values of pixels in the current frame to brightness values of pixels in the reference frame.

The scene change frame information can be in a format that facilitates previewing by the user. The scene change frame information can include time data indicating a unique point in time of each scene change frame within a duration of the stored video recording.

The mobile communication terminal 500 also includes: a transceiver 550 adapted to receive signals including video recordings, which are stored in the memory 520. The processor 540 is further adapted to cooperate with the transceiver 550, the memory 520, and the display device 530 to perform the method for video searching according to the present invention by determining a number of scene change frames in the video recordings based upon scene change frame information corresponding to one or more scene change frames inserted into the video recordings, adjusting the number of scene change frames such that the number of scene change frames is equal to a reference value, and displaying the scene change frames upon user request to search scenes in the video recording.

The processor 540 is adapted to adjust the number adjust the number of scene change frames by either adding scene change frames or removing scene change frames based upon a difference between the number of the scene change frames and the reference value. The adding or removing can be performed based upon a time interval between adjacent scene change frames.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structure described herein as performing the recited function and not only structural equivalents but also equivalent structures.

What is claimed is:

1. An apparatus for video image navigating in a mobile communications terminal, the apparatus comprising:
    a scene change frame detector adapted to detect a preset number of scene change frames in streaming video data in response to a user request for video searching and to output the detected scene change frames; and
    a display unit adapted to display the detected scene change frames,
    wherein the scene change frame detector comprises:
        a candidate motion frame detector adapted to detect candidate motion frames in the streaming video data; and
        a scene change preliminary candidate frame detector adapted to detect a scene change preliminary candidate frame based on the detected candidate motion frames.

2. The apparatus of claim 1, further comprising a video decoder adapted to decode an input video signal and to output the decoded video signal as streaming video data.

3. The apparatus of claim 1, wherein the scene change frame detector further comprises:
- a scene change timer adapted to determine a generation time of the detected scene change preliminary candidate frame;
- a scene change candidate frame detector adapted to detect a scene change candidate frame based on the determined generation time; and
- a scene change frame determiner adapted to determine a scene change frame based on a number of detected scene change candidate frames.

4. The apparatus of claim 3, wherein the scene change frame determiner is adapted to determine the scene change frame based a number of detected scene change candidate frames that is equal to a preset reference value.

5. The apparatus of claim 3, wherein the candidate motion frame detector is further adapted to detect a current frame as the candidate motion frame when a difference between a motion value of pixels in the current frame and a motion value of pixels in a reference frame is greater than a preset reference value.

6. The apparatus of claim 5, wherein the candidate motion frame detector is further adapted to select the reference frame according to a preset frame unit.

7. The apparatus of claim 5, wherein the candidate motion frame detector is further adapted to determine the motion value of the pixels in the reference frame by adding the motion values of selected pixels according to a preset pixel unit.

8. The apparatus of claim 3, wherein the scene change preliminary candidate frame detector is adapted to detect a current candidate motion frame as the scene change preliminary candidate frame when a difference between a brightness value of pixels in the current candidate motion frame and a brightness value of pixels in a reference frame is greater than a preset reference value.

9. The apparatus of claim 8, wherein the scene change timer is further adapted to add a time flag field to the detected scene change preliminary candidate frame, the time flag field comprising the generation time of the detected scene change preliminary candidate frame.

10. The apparatus of claim 3, wherein the scene change candidate frame detector is adapted to detect a current scene change preliminary candidate frame as the scene change candidate frame when a difference between a generation time of the current scene change preliminary candidate frame and generation time of a previous scene change candidate frame is greater than a preset reference value.

11. The apparatus of claim 4, wherein the scene change frame determiner is further adapted to adjust the number of detected scene change candidate frames such that the number of detected scene change candidate frames is equal to the preset reference value.

12. The apparatus of claim 11, wherein the scene change frame determiner is further adapted to add at least one scene change candidate frame when it is determine that the number of detected scene change candidate frames is smaller than the preset reference value, the at least one added scene change candidate frame between scene change candidate frames having the greatest difference in generation times.

13. The apparatus of claim 12, wherein the scene change frame determiner is further adapted to determine the at least one added scene change candidate frame as a frame in the middle of the scene change candidate frames having the greatest difference in generation times.

14. The apparatus of claim 11, wherein the scene change frame determiner is further adapted to remove at least one scene change candidate frame when it is determined that the number of detected scene change candidate frames is greater than the preset reference value, the at least one removed scene change candidate frame having the smallest difference in generation times from an adjacent scene change candidate frame.

15. A method for video image navigating in a mobile communications terminal, the method comprising:
- detecting a preset number of scene change frames in streaming video data in response to a user request for video searching;
- outputting the detected scene change frames; and
- displaying the detected scene change frames,
- wherein detecting the preset number of scene change frames comprises:
  - detecting candidate motion frames in the streaming video data; and
  - detecting a scene change preliminary candidate frame based on the detected candidate motion frames.

16. The method of claim 15, further comprising decoding an input video signal and outputting the decoded video signal as streaming video data.

17. The method of claim 15, further comprising:
- determining a generation time of the detected scene change preliminary candidate frame;
- detecting a scene change candidate frame based on the determined generation time;
- determining whether the scene change candidate frame is completely detected; and
- determining a scene change frame based on a number of detected scene change candidate frames when the scene change candidate frame is completely detected.

18. The method of claim 17, further comprising determining the scene change frame based a number of detected scene change candidate frames that is identical to a preset reference value.

19. The method of claim 17, wherein detecting candidate motion frames comprises:
- calculating a difference between motion values of pixels in a current frame and motion values of pixels in a reference frame;
- comparing the calculated difference with a preset reference value; and
- detecting the current frame as the candidate motion frame when the calculated difference is greater than the preset reference value.

20. The method of claim 19, further comprising selecting the reference frame according to a preset frame unit.

21. The method of claim 19, further comprising determining the motion value of the pixels in the reference frame by adding motion values of selected pixels according to a preset pixel unit.

22. The method of claim 17, wherein detecting the scene change preliminary candidate frame comprises:
- calculating a difference between brightness values of pixels in the current candidate motion frame and brightness values of pixels in a reference frame;
- comparing the calculated difference with a preset reference value; and
- detecting the current candidate motion frame as the scene change preliminary candidate when the calculated difference is greater than the preset reference value.

23. The method of claim 17, further comprising adding a time flag field to the detected scene change preliminary candidate frame, the time flag field comprising the generation time of the detected scene change preliminary candidate frame.

24. The method of claim 17, wherein detecting the scene change candidate frame comprises:
- calculating a difference between the generation time of a current scene change preliminary candidate frame and a generation time of a previous scene change candidate frame;
- comparing the calculated difference to a preset reference value;
- detecting the current scene change preliminary candidate frame as the scene change candidate frame when the calculated difference is greater than the preset reference value; and
- counting the number of the detected scene change candidate frames.

25. The method of claim 17, wherein determining the scene change frame comprises:
- determining the number of detected scene change candidate frames;
- comparing the detected number of the scene change candidate frames to a preset reference value; and
- determining the detected scene change candidate frames as a scene change frame when the number of detected scene change candidate frames is equal to the preset reference value.

26. The method of claim 25, further comprising adjusting the number of detected scene change candidate frames such that the number of detected scene change candidate frames is equal to the preset reference value, the adjustment based on a difference between the detected number of the scene change candidate frames and the preset reference value.

27. The method of claim 26, wherein adjusting the number of detected scene change candidate frames comprises adding at least one scene change candidate frame when the number of detected scene change candidate frames is smaller than the preset reference value, the at least one added scene change candidate frame between scene change candidate frames having the greatest difference in generation times.

28. The apparatus of claim 27, further comprising determining the at least one added scene change candidate frame as a frame in the middle of the scene change candidate frames having the greatest difference in generation times.

29. The method of claim 26, wherein adjusting the number of detected scene change candidate frames comprises removing at least one scene change candidate frame when the number of detected scene change candidate frames is greater than the preset reference value, the at least one removed scene change candidate frame having the smallest difference in generation times from an adjacent scene change candidate frame.

30. A mobile communication terminal comprising:
- a video recorder adapted to capture video recordings;
- a memory adapted to store the video recordings;
- a display device adapted to display the stored video recordings; and
- a processor adapted to:
- process a stored video recording according to frames by comparing a number of pixels of a current frame with a number of pixels of a reference frame to determine whether the current frame should be used as a scene change frame that can be viewed by a user when searching for a desired scene,
- generate and insert scene change frame information corresponding to at least one scene change frame into portions of the stored video recording, and
- display the scene change frames upon a user request to search scenes in the stored video recording.

31. The terminal of claim 30, wherein the processor is further adapted to compare the pixels of the current frame with the pixels of every nth frame of the stored video recording.

32. The terminal of claim 30, wherein the processor is further adapted to compare the pixels of the current frame with the pixels of the reference frame by calculating differences between motion values of the pixels in the current frame and motion values of the pixels in the reference frame.

33. The terminal of claim 30, wherein the processor is further adapted to determine the current frame as a scene change frame if the current frame contains more changes in image motions than the reference frame.

34. The terminal of claim 33, wherein the processor is further adapted to determine the changes in image motions by comparing brightness values of pixels in the current frame to brightness values of pixels in the reference frame.

35. The terminal of claim 30, wherein the processor is further adapted to generate the scene change frame information in a format that facilitates previewing by the user.

36. The terminal of claim 30, wherein the processor is further adapted to include time data in the scene change frame information, the time data indicating a unique point in time of each scene change frame within a duration of the stored video recording.

37. A mobile communication terminal comprising:
- a transceiver adapted to receive signals including video recordings;
- a memory adapted to store the video recordings;
- a display device adapted to display the stored video recordings; and
- a processor adapted to:
- determine a number of scene change frames in a stored video recording based upon scene change frame information, the scene change frame information corresponding to at least one scene change frame inserted into the video recording,
- adjust the number of scene change frames such the number of scene change frames is equal to a reference value, and
- display the scene change frames upon a user request to search scenes in the video recording.

38. The terminal of claim 37, wherein the processor is further adapted to adjust the number of scene change frames by one of adding scene change frames or removing scene change frames based upon a difference between the number of the scene change frames and the reference value.

39. The terminal of claim 37, wherein the processor is further adapted to adjust the number of scene change frames based upon a time interval between adjacent scene change frames.

* * * * *